(12) United States Patent
Warrington

(10) Patent No.: US 7,194,682 B2
(45) Date of Patent: Mar. 20, 2007

(54) SYSTEM AND METHOD FOR MANAGING WEB PAGE COMPONENTS

(75) Inventor: Simon P. Warrington, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 608 days.

(21) Appl. No.: 09/972,549

(22) Filed: Oct. 5, 2001

(65) Prior Publication Data

US 2002/0083097 A1    Jun. 27, 2002

(30) Foreign Application Priority Data

Oct. 6, 2000    (CA)    ................................. 2322594

(51) Int. Cl.
*G06F 17/30* (2006.01)
(52) U.S. Cl. ........................ 715/517; 715/513; 715/500
(58) Field of Classification Search ................ 717/107, 717/173, 137, 111, 100, 11; 709/203, 219, 709/217, 202; 707/10; 395/712; 715/517, 715/513, 500
See application file for complete search history.

(56) References Cited

U.S. PATENT DOCUMENTS

| | | | | |
|---|---|---|---|---|
| 5,919,247 A | * | 7/1999 | Van Hoff et al. | 709/217 |
| 5,923,885 A | * | 7/1999 | Johnson et al. | 717/176 |
| 5,991,534 A | * | 11/1999 | Hamilton et al. | 717/111 |
| 6,154,878 A | * | 11/2000 | Saboff | 717/173 |
| 6,237,135 B1 | * | 5/2001 | Timbol | 717/107 |
| 6,266,666 B1 | * | 7/2001 | Ireland et al. | 707/10 |
| 6,314,451 B1 | * | 11/2001 | Landsman et al. | 709/203 |
| 6,314,565 B1 | * | 11/2001 | Kenner et al. | 717/171 |
| 6,438,744 B2 | * | 8/2002 | Toutonghi et al. | 717/137 |
| 6,631,512 B1 | * | 10/2003 | Onyeabor | 717/100 |
| 6,738,804 B1 | * | 5/2004 | Lo | 709/219 |
| 6,816,880 B1 | * | 11/2004 | Strandberg et al. | 709/202 |
| 2004/0163045 A1 | * | 8/2004 | Hui et al. | 715/513 |

* cited by examiner

*Primary Examiner*—Heather R. Herndon
*Assistant Examiner*—Gautam Sain
(74) *Attorney, Agent, or Firm*—A. Bruce Clay, Esq.; Hoffman, Warnick & D'Alessandro LLC

(57) ABSTRACT

A method and apparatus facilitate the creation and maintenance of web pages which include reusable, upgradeable components. The apparatus provides a simple client object which can identify and contain properties for reusable components from a library. The client object does not itself need to be upgraded when components are upgraded and therefore it is not necessary to re-specify all of the properties for a component when a component is upgraded. An upgrade tool reads the properties of instances of the client object which is present in the source for a web publishing software, identifies an upgraded version of a component identified by the client object, reads the properties specified for the component by the client object and reconfigures the instance of the client object to identify the upgraded component and to specify corresponding properties for the upgraded component. Use of the invention facilitates rapid upgrading of web pages.

36 Claims, 1 Drawing Sheet

SYSTEM AND METHOD FOR MANAGING WEB PAGE COMPONENTS

TECHNICAL FIELD

This invention relates to the creation and maintenance of web pages. The invention has particular application in the maintenance of web pages which include updateable software components. More specifically, the invention relates to a method and apparatus for managing software components of web pages as the web pages are upgraded and updated.

BACKGROUND

Web pages can provide user interfaces which permit users to access and manipulate information both on the World Wide Web ("WWW") and on intranets maintained for internal use by various organizations. A web page is a document which is associated with a Uniform Resource Locator ("URL") or other suitable address and which is viewable by a browser. In this specification the term "web page" has a broad meaning and is not limited to documents available on the world wide web of the Internet. Currently available browsers include Navigator® from Netscape Communications, Inc. and the Internet Explorer® from Microsoft Corporation. A web page includes information and instructions provided in a suitable mark up language such as Hypertext Markup Language ("HTML") or Extensible Markup Language ("XML") which inform browser software how the information is to be formatted and displayed to a user.

Web pages do not merely provide static information but can also contain dynamic content. For example, web pages can serve as interfaces to various applications including applications which permit searching for, formatting and displaying information from databases. Existing computer software facilitates the creation of interactive web pages. For example, web publishing software such as WEBSPHERE STUDIO™ from IBM Corporation or VISUAL INTERDEV™ from Microsoft Corporation both provide visual development environments within which web page authors can design web pages using pre-built components. This speeds the development process. Component technology enables e-business and other web-based applications to be created and integrated by using pre-built, pre-tested and reusable components. This is faster and lower in cost than is building web sites from scratch.

One environment in which reusable components can be combined and customized to create web sites is the JAVA™ environment. A Java Server Page ("JSP") may contain text as well as various objects capable of generating dynamic content. The objects may include code in the form of JavaBeans™, JDBC™ objects, Enterprise Java Beans™ and Remote Method Invocation, for example.

Other environments use Design-time Controls ("DTCs") as reusable components. A DTC is an ActiveX control that implements a special interface for generating text. A DTC may be used at design time to insert significant amounts of HTML text into a web page. The specific text which is inserted can be determined by a set of properties selected by the web author at design time. The generated text (which may be called "run-time" text because it is used when the web page is displayed by a browser) is saved together with text for other components of the web page in a file. The file can then be placed on line to be accessed by users. A DTC is not active at run-time.

While current web publishing software greatly facilitates the initial creation of complex web pages, it remains time consuming to update web pages. One reason for this is that the characteristics of a previously designed web page are defined, in part, by the properties of replaceable components such as DTCs. Where an original DTC is replaced with a new or upgraded DTC, any properties which may have been set for the original DTC are lost. Thus a web page author updating a web page may need to labouriously locate each DTC which has been changed and specify all of its properties.

There is a need for a system capable of upgrading and updating web pages which avoids the need to re-specify all of the properties for a component if the component is updated. There is a particular need for such a system which is capable of working with current and future web publishing systems.

SUMMARY OF THE INVENTION

This invention provides methods and apparatus for use in publishing web pages which involve the use of reusable, upgradeable software components. A client object permits runtime text corresponding to the software components to be incorporated into source files for web pages by standard web publishing software. The software components can be replaced or upgraded without changing the client object.

Accordingly, the invention provides a method for creating a web page source file in a programmed computer. The method comprises inserting an instance of a client object into a web page; permitting the client object instance to obtain from a switchboard a list of available reusable software components; receiving from an author selection information identifying a selected one of the available components; displaying a customizer interface and permitting an author to specify properties for the selected available component; generating runtime text corresponding to the selected available component; and, providing the runtime text to the client object.

The client object may comprise a design time control which may be a Java bean encapsulated in an Active X control.

Another aspect of the invention provides a method for updating a web page comprising one or more reusable software components. The method comprises providing a web page comprising one or more instances of a client object, each instance of the client object having selection information identifying an original reusable software component having one or more configurable properties. An updated set of software components is provided and the method proceeds by reading from an instance of the client object the selection information and determining whether a newer version of the reusable software component identified by the selection information is available. If a newer version of the reusable software component identified by the selection information is available, the method replaces the selection information with new selection information identifying the newer version of the reusable software component.

Preferably the newer version of the reusable software component has a common set of one or more properties in common with a set of properties of the original reusable software component and the method comprises determining values for properties in the common set of the original reusable software component; and, automatically setting values for the properties in the common set of the newer version of the reusable software component to be the same as the values of the properties in the common set of the original reusable software component. Most preferably, determining values for properties in the common set of the original reusable software component comprises reading runtime text corresponding to the original reusable software component.

A further aspect of the invention provides a method for updating source code for a web page, the source code comprising one or more blocks of runtime text each corresponding to a configurable reusable component, each block of runtime text comprising a default indicator indicating whether or not the corresponding configurable reusable component was in a default configuration. The method comprises: selecting a block of runtime text for which the default indicator indicates that the corresponding configurable reusable component was in a default configuration; identifying a configurable reusable component corresponding to the selected block of runtime text; determining whether there is a newer version of the configurable reusable component; if there is a newer version of the configurable reusable component, generating runtime text corresponding to the newer version of the configurable reusable component; and, replacing the block of runtime text in the source code with the runtime text corresponding to the newer version of the component.

Another aspect of the invention provides apparatus for creating web pages. The apparatus comprises a computer system having: a client software object, the client software object capable of retrieving a list of one or more available reusable software components, identifying a selected one of the available reusable software components selected by an author, and receiving runtime text corresponding to the selected reusable software component; web publishing software capable of incorporating runtime text from one or more instances of the software client object in a source file for a web page; and, switchboard software capable of generating runtime text corresponding to the selected reusable component and providing the runtime text to a corresponding instance of the client software object for inclusion in the runtime file.

In preferred embodiments, the apparatus comprises an update tool. The update tool comprises software which causes the computer system to: read properties of an original instantiated reusable component; instantiate an updated version of the instantiated reusable component; and, configure properties of the updated version of the instantiated reusable component to match the properties of the original instantiated reusable component.

Another aspect of the invention provides apparatus for creating web pages. The apparatus comprises a computer system which provides one or more available reusable software components, each comprising rules for the generation of corresponding runtime text; a means for providing a list of available reusable components; a means for configuring properties of a selected reusable component; and a client software object, adapted to receive the list of available reusable components, to allow an author to select one of the available reusable components and to receive runtime text from the selected one of the available reusable components.

A still further aspect of the invention provides an article of manufacture comprising a program storage medium readable by a computer and embodying one or more instructions executable by the computer to perform a method for creating a web page as described herein.

Further features and advantages of the invention are described below.

BRIEF DESCRIPTION OF THE DRAWINGS

In figures which illustrate non-limiting embodiments of the invention.

Figure 1:
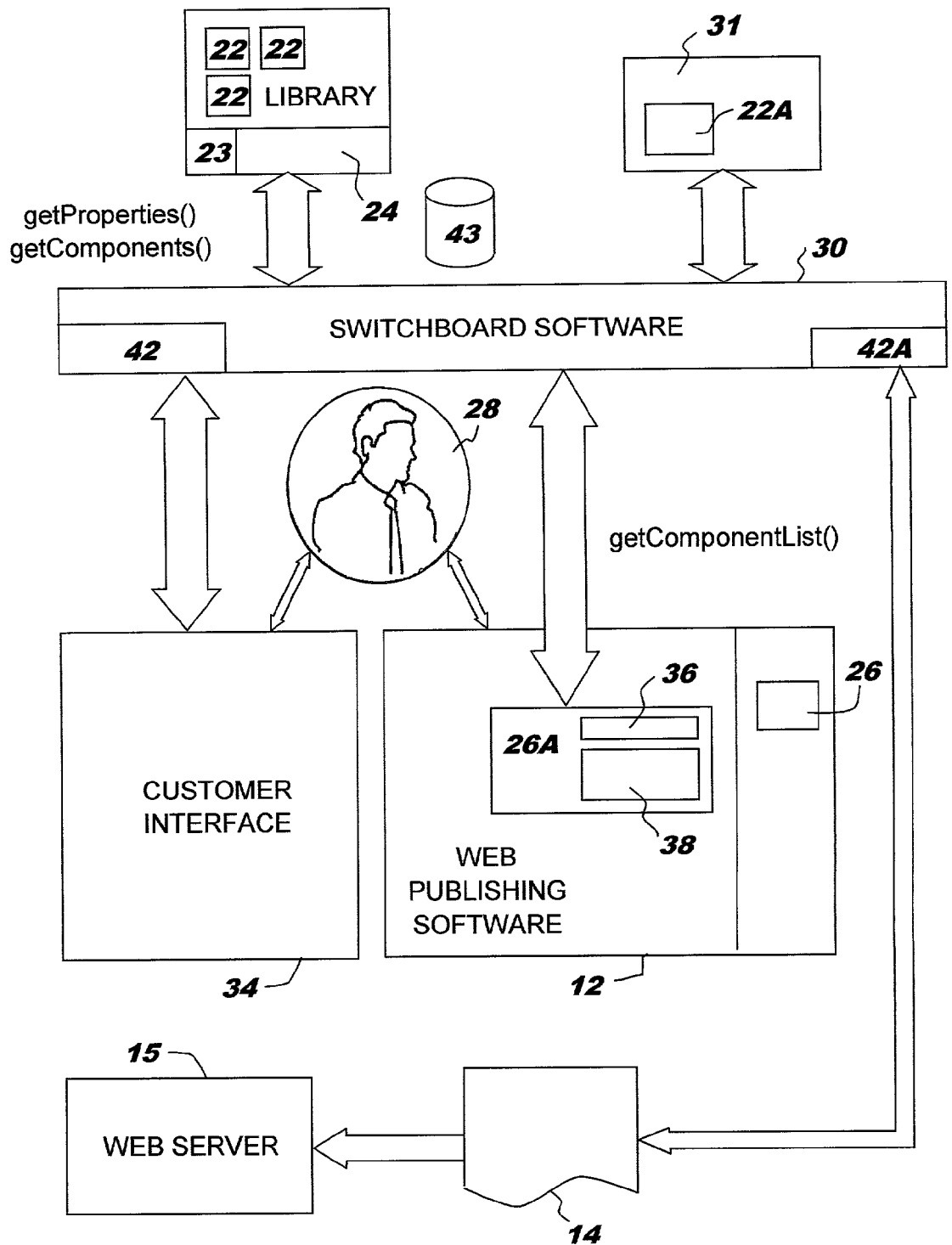
FIG. 1 is a block diagram which illustrates a web publishing system according to a currently preferred embodiment of the invention.

| List of Reference Numerals | | | |
|---|---|---|---|
| 10 | web page publishing system | 12 | web page authoring software |
| 14 | web page (source file) | 15 | web server software |
| 20 | library | 22 | components |
| 22A | instance of component | 23 | component list |
| 24 | library manager | 26 | client object |
| 28 | user | 30 | switchboard |
| 34 | customizer interface | 36 | selected component name |
| 38 | runtime text | 31 | memory space |
| 42 | upgrade tool | 42A | upgrade tool |
| 43 | database | | |

DESCRIPTION

This invention provides a component manager which manages components for inclusion in web pages. The component manager preferably includes an upgrade tool which identifies all managed components on a given site, reads the current properties of each of the managed components, and, for any component which has been changed or updated, automatically re-specifies the properties of the component to preserve the original configuration as closely as possible.

FIG. 1 illustrates a system 10 according to this invention. System 10 works in conjunction with web page authoring software 12 to generate web pages 14. Web pages 14 comprise runtime text which can be interpreted by web server software to generate web pages. System 10 comprises a library 20 which contains one or more components 22 for use in web pages. Components 22 may, for example, include components which accept database queries from users, tables for displaying information retrieved from a database, components for accepting on-line payments and the like. Library manager software 24 provides services which allow other applications to access components 22. A list 23 of available components 22 in library 20 is maintained by library manager 24. Components 22 may comprise serialized objects such as JAVABEAN™ objects. A JAVABEAN object ("Bean") is a Java class written according to rules which permit it to be reused. In preferred embodiments, components 22 are JAVABEAN objects stored in multiple Java Archive ("JAR") files each containing a different version of components 22. Components 22 may also comprise XML files. In the currently preferred embodiment of the invention, components 22 comprise XML files Web publishing software 12 can access components 22 by way of a client object 26 which is compatible with web publishing software 12. A switchboard 30 links the client object 26 to the components 22 in library 20. Switchboard 30 is preferably a software layer which provides services to client objects 26 and interacts with library 20. The overall operation and design of web publishing software suitable for permitting components to be selected and used is known to those skilled in the art and is therefore not described here in detail.

Client object 26 may be, for example, a design time control ("DTC"). Client object 26 need only provide very limited functionality, as described below. In preferred embodiments of the invention, client object 26 is a JAVA bean which is encapsulated in an ActiveX wrapper so as to function as a design time control. Software tools for creating ActiveX wrappers for JAVA beans are available, for example, from Sun Microsystems of Cupertino, Calif., U.S.A.

An author or user 28 can use components 22 in a web page by instructing software 12 to use client object 26 in the web page. The way in which this is done will vary somewhat depending on the particular web publishing software 12 being used. In typical web publishing software the author can drag an icon representing the client object 26 onto a window representing the page being developed and can then open client object 26 for interaction by clicking on client object 26. The web publishing software 12 produces a source file which defines web pages to be served by a web server 15. The source file contains runtime code produced by components 22 and other text produced by web publishing software 12. For example, the source file contains information identifying and specifying the properties of each instance of client object 26 used in a web page as well as information describing text and other components which may be included in the web page.

An author 28 can modify an existing web page (i.e. the contents of a source file which is used by a web server to generate the web page and define the web page's functionality) by loading the source file 14 into web publishing software 12, modifying the information from the source file, and then generating a revised source file.

Client object 26 has methods which permit it to request from switchboard 30 a list 23 of available components 22 in library 20 and to request from switchboard 30 a customizer interface 34 which permits author 28 to set properties to customize the behaviour of a selected component 22. Client object 26 can also accept runtime text from switchboard 30. In the embodiment illustrated in the Figure, the client object 26 has a getComponentList( ) method. When client object 26 is instantiated it initializes itself. As part of the initialization it invokes the getComponentList( ) method to request a list of available components 22 from the switchboard. The switchboard has a getComponents( ) method which it uses to obtain from library 20 a list of all available components 22. Switchboard 30 then returns this list to client object 26. Client object 26 then presents this list to the author so that the author may select one of components 22. The instance of client object 26 retains the name 36 or other component identification information which identifies the selected component 22.

When a component 22 has been selected, client object 26 requests the customizer interface 34 from switchboard 30. Switchboard 30 has a getProperties( ) method which it uses to obtain a list of available properties for the selected component 22. Where components 22 are JAVA components, switchboard 30 may use the java.lang.reflect package to query a selected component 22 for a list of all of its available properties. Switchboard 30 can then use this list of properties to generate a customizer interface 34 which permits the author to change any of the properties, as desired. Switchboard 30 then presents the customizer interface 34 to the author. The customizer interface permits the author to specify properties for the selected object 22. Customizer interface 34 may comprise, a simple properties sheet, but most preferably comprises a graphical user interface ("GUI") or the like which permits an author 28 to view and specify all properties of the component 22. When the author closes the customizer interface, switchboard 30 returns runtime text for the customized component 22 to the client object 26.

An author 28 can create one or more instances of client object 26 on a web page. Each instance of client object 26 can be customized to represent a specific available component 22 with certain properties. Upon creating an instance of client object 26, the author can view the list of available components 22, for example in a drop-down list provided by client object 26, and select one. The author can then view the properties for the selected component 22 in customizer interface 34 and set the properties as desired by way of customizer interface 34 to customize the behaviour of the selected component 22.

In the currently preferred embodiment, when a component 22 has been selected, switchboard 30 creates an instance 22A of that component 22 in a memory space 31 accessible to switchboard 30 for use in generating runtime text. Switchboard 30 initially configures the instance of the component in a default configuration.

For example, where components 22 are XML components then each component can be represented as a tree in the XML document object model ("DOM"). When the author specifies that a client object 26 is to refer to a specific component 22 then switchboard 30 instantiates the selected component 22 by loading the DOM tree for that component 22 into memory space 31. As the author operates customizer interface 34 any changes to the properties of the component 22 are recorded in the DOM tree. When the author closes the customizer interface 34 the switchboard 30 generates runtime text 38 for the component 22 as specified by the instance of the component 22 in space 31 and by rules for that component 22 in library 20. The runtime text 38 is returned to the client object 26.

If the author later wishes to reconfigure a previously-configured component 22 then the author can open the appropriate instance of client object 26 in web publishing software 12, and cause the client object 26 to request the customizer interface for the component 22 selected by that instance of client object 26 (client object 26 may, for example, provide a button or the like which requests that switchboard 30 generate a customizer interface 34 for the component 22 selected by client object 26). Client object 26 sends to switchboard 30 both the name of the component 22 and the previously generated runtime text 38. Switchboard 30 can identify the component 22 by name, obtain the appropriate component 22 from library 20, read the runtime text 38 to determine the previously-configured properties for the component 22 and create a DOM tree in memory space 31 which is configured according to the properties in the retrieved runtime text 38. Switchboard 30 generates an appropriate customizer interface 34. The author can change properties for the component 22. When the author is satisfied with the configuration of the component 22 then the author closes the customizer interface and switchboard 30 returns the new runtime text for the instance of client object 26.

It can be understood from the foregoing that client object 26 can be very simple. Each instance of client object 26 need only to hold a property which identifies a selected component 22. Each instance of client object 26 can receive a list of available components 22 from switchboard 30 and can signal switchboard 30 to provide a customizer interface 34 for a selected component 22. Each instance of client object 26 can receive from switchboard 30 runtime text.

When web publishing software 12 saves a project, the properties of each instance of client object 26 used in the project are saved by web publishing software 12 in source file 14. Because client object 26 does not contribute to the functionality of components 22, it is not necessary to change client object 26 when any of components 22 are replaced or upgraded. The same client object 26 can be used with the changed or upgraded components 22.

Each instance of a component 22 from library 20 includes suitable rules which permit switchboard 30 to generate runtime text that, when incorporated into a web page 14, will provide the desired functionality. The runtime text supplied for each component 22 will depend upon the properties selected for that component 22. Switchboard 30 generates the runtime text corresponding to the instances of client objects 22 in space 31 based upon rules in library 20 and passes that runtime code to the appropriate instance of client object 26.

Web publishing software 12 can create web pages 14 in the same fashion that would occur if client object 26 were a functional reusable component of a type with which web publishing software 12 can work. On creating a web page 14 web publishing software 12 receives from each instance of client object 26 the customized runtime text supplied by switchboard 30, combines that with template text which the author may have entered into the web publishing software 12 in any usual manner and sends the resulting source code to a source file 14. Thus, through the use of switchboard 30 and the reusable components 22 in library 20 an author can achieve the same result that could be achieved by importing reusable components directly into the web publishing software 12. System 10 has the advantage that it permits one or more components 22 to be replaced or upgraded without losing the properties which have previously been saved for the component.

Where library 20 contains different versions of the same component 22 an author may even choose to use different versions of the same control 22 on the same web page.

Switchboard 30 preferably adds tags to the text generated by each component 22. The tags may be used to identify the portions of the source code corresponding to runtime text for each component 22. These tags may be used for upgrading or replacing components, as described below. The runtime text supplied to an instance of client object 26 by switchboard 30 includes any text necessary to declare components 22. For example, where the web page being created is a JSP and a component 22 being used includes a JAVA bean named "setUserName" then switchboard 30 could supply the tag<jsp:useBean id="username" type=com.ibm.UserName> for inclusion in the source file 14 for the web page. Switchboard 30 may invoke helper applications (which may be "helper classes" in the event that switchboard 30 is written in the JAVA language) to help format the runtime text in a suitable way. The helper classes monitor information being passed to web publishing software 12 by switchboard 30 and modify that information by inserting tags, text, or other supporting information.

It may be periodically desirable to update components 22 in library 20 to provide new functionality, to simply ensure that the most current versions of components 22 are being used for reasons of compatibility with certain web browser software, or the like. System 10 preferably includes an upgrade tool 42. Upgrade tool 42 facilitates the automatic upgrading of a web page to use new versions of one or more components 22. Upgrade tool 42 may take various forms. In the currently preferred embodiment of the invention, library 20 checks to see whether it contains an updated version of a component 22 each time switchboard 30 requests the properties for a component 22. If there is a new version then the upgrade tool 42 is invoked. In the alternative, upgrade tool 42 could be invoked each time an author opens a previously-configured client object 26. The upgrade tool 42 may be incorporated into switchboard 30 and may obtain from client object 26 the name of the component 22 and check in library 20 to determine if there is a more recent version of that component 22.

Identifying a current version for a component 22 may be performed by looking up the original name for the component 22 in library 20 or by looking up the original name, or original name and version of the component 22 in a database 43 accessible to upgrade tool 42. If there is a new version then upgrade tool 42 generates a dialog box, or other user interface which asks whether the author wishes to upgrade to a new version of the component 22. If so then upgrade tool 42 obtains and supplies to the instance of client object 26 the name of the new version of component 22 and loads into space 31 an instance of the new version of the component 22.

Upgrade tool 42 then determines what properties to set for the new version of component 22 by reading the properties from the original version of component 22. In the currently preferred embodiment, this is done by reading the runtime text produced by the original version of component 22 (as received from client object 26). These properties may be called configuration information. Upgrade tool 42 then determines whether the current version of component 22 can be configured in the same way. If so, upgrade tool 42 modifies the instance of the current version of the component 22 in memory space 31 so that its properties match those read from the original version of component 22. If necessary, upgrade tool 42 also changes the property of client object 26 to identify the current version of component 22 instead of the original version of component 22. Where the current version of the component 22 has new properties not specified for the original version of the component 22 then upgrade tool 42 preferably sets the new properties to default values and signals to the author, for example, by displaying a message, that not all of the properties of the upgraded component 22 were carried over from the original version of the component 22.

In a simple version of upgrade tool 42, upgrade tool 42 merely compares a list of properties available in the current version of component 22 with a list of properties specified in an instance of an earlier version of component 22 corresponding to an instance of client object 26. Where properties of the same name exist, upgrade tool 42 sets the properties for the current version of component 22 to the same values as specified for the properties of the same name in the original version of the component 22. There will be numerous instances where old and new versions of a component have identical sets of properties but are written to produce runtime code appropriate for different versions of a web server.

In a more complex version of upgrade tool 42, a database 43, which could be included in library manager 24, contains a map which maps property settings for earlier versions of a component 22 to equivalent property settings for a new version of the component 22.

It can be appreciated that upgrade tool 42 permits an author to selectively upgrade the components 22 used in a web page to new versions by simply opening the client object 26 corresponding to each component. Properties are carried over to the upgraded component. Where there are no conflicts then upgrade tool 42 can upgrade all of the components 22 used on a web page with no significant user input. An author may select components 22 to be upgraded individually. An author may even have different versions of the same component on the same web page.

After a component 22 has been upgraded then the author may opt to change one or more properties for that component 22 by invoking customizer interface 34, as described above. The author may do this, for example, to take advantage of a new feature of an upgraded component 22.

Upgrade tool 42 preferably warns the author in the event that there are incompatibilities which prevent the identification or proper configuration of a current component 22 which corresponds to an original component 22. For example, a current version of a component 22 may lack a property which has been set for an earlier version of the component 22. In such cases, upgrade tool 42 preferably:

- provides the author with the option of cancelling the upgrade, at least in respect of the affected component 22, or continuing;
- if the author elects to continue with the upgrade then upgrade tool 42 preferably configures as many properties of the upgraded component 22 to correspond with the properties of the original component 22 as it can resolve, and provides the author with a list of the properties which have been successfully set.

The author can then access the configuration for the current component 22 via customizer interface 34 and make whatever amendments to the configuration as may be necessary.

Upgrade tool 42 preferably checks to ensure that there are no incompatibilities between original and new versions of components 22 and to ensure that library 20 contains versions of all components 22 being used in a particular case. The version of an original component 22 may be determined in various ways depending upon the nature of component 22. For example, if each instance of a component 22 is a JAVA Bean which has been stored in a serialized representation then upgrade tool 42 may retrieve a Stream Unique Identifier ("SUI") from the component 22 or, if that is not present, computer a SUI from the component 22 through the use of the versioning features included in the JAVA language. The SUI may then be compared to an attribute of the current version of the component 22 which indicates whether or not the current version is compatible with the original version. This requires that each newer version of a component 22 in component library 20 must include attributes which specify the earlier versions with which it is compatible according to good JAVA programming techniques, which are well understood by those skilled in the art. If the attribute for a new version of a component 22 does not match the SUI generated for the original version of the component 22 then upgrade tool 42 may signal that the new version is incompatible with the original version.

If components 22 are XML components then they may each have a property which specifies a version number. The name of the component 22 may also include version information.

Preferably system 10 also provides a facility for rapidly updating the run-time code corresponding to components 22 without manually modifying the source file for the web page. Thus facility may be incorporated in upgrade tool 42 although it may be provided as a separate component 42A. Upgrading runtime text is facilitated by the provision of tags which surround the runtime text associated with each instance of client object 26 (i.e. each component 22) in source code 14. The runtime text for each component 22 might, for example be inserted in the following context:

```
<icmsaviComponentname = "[component name]"
        type = "[component type]"
        default = "[true/false]">
    . . . [component runtime code] . . .
</icmsaviComponent>
```

Upgrade tool 42A reads the source file 14 and uses the tags to identify runtime text corresponding to various components 22. For each component, if the component does not have any custom property settings (as indicated by default=true in the tag), and if the upgrade tool 42A has access to an upgraded version of the component, then the upgrade tool 42A simply replaces the runtime text between the tags with runtime text produced by the upgraded version of the component (with all of its properties in their "default" state). Upgrade tool 42A also modifies the tags surrounding the runtime text for the component 22 if necessary. The upgraded runtime text can be immediately made available to a web server. Most current web servers will automatically recognize that the runtime text for a web page has changed and will automatically recompile the page, if necessary. For example, where the runtime text comprises a JAVA server page ("JSP"), current versions of the JSP engine will detect the change, recompile the JSP and continue working.

It can be appreciated that preferred embodiments of this invention provide some advantages over current systems which lose the previously set properties of components which are replaced or upgraded. These include:

- Since client object 26 requires only a very simple user interface, the amount of documentation required for client object 26 is reduced. Since components 22 can be upgraded or replaced without replacing client object 26 changes in the documentation for client object 26 will be infrequent.
- Client objects 26 are very simple and so can be readily written for use with any web publishing system 12.
- Changes to web pages can be accomplished more efficiently.
- Authoring web pages can be done without any significant knowledge of JSP technology.
- The coding of components 22 is farther removed from scrutiny than is the coding of components which are manipulated directly by web programming software 12.
- Components 22 can be made available to authors using any web publishing software which supports client objects 26.
- An author does not need to know about switchboard 30. The author interacts with any suitable web publishing software 12 and customizer interface 34.

As will be apparent to those skilled in the art in the light of the foregoing disclosure, many alterations and modifications are possible in the practice of this invention without departing from the spirit or scope thereof. For example:

- while client object 26 has been described as being a simple DTC, as is preferred in certain embodiments of the invention, client object 26 could be another object which supports the interface of switchboard 30.
- while reusable components 22 have been described as JAVABEAN™ objects, or XML components, components 22 could be provided in a different format.
- In the above description, switchboard 30 recreates the state of a component 22 from the name of the component 22 and the runtime text for the component 22 as supplied by client object 26. Switchboard 30 could, in the alternative store details of the configured properties of each component 22 which corresponds to an instance of client object 26 and then associate the instance of the selected component 22 with the ID of the client object 26 to which it corresponds. This correspondence may be maintained in various ways. For example, each instance of client object 26 may have a serial number or other ID. When an author invokes customizer interface 34 from a client object 26 to change properties of the corresponding component 22 then switchboard 30 could change the properties of the instance of the component which corresponds to that instance of client object 26. The customized instances of components 22 could be saved in a location accessible to switchboard 30.

Accordingly, the scope of the invention is to be construed in accordance with the substance defined by the following claims.

The embodiments of the invention in which an exclusive property or privilege is claimed are defined as follows:

1. A method for creating a web page source file in a programmed computer, the method comprising:
   a) inserting an instance of a client object into a web page, the client object adapted to use a selected available component on the web page;
   b) permitting the client object instance to obtain from a switchboard a list of available reusable software components for use in the web page;
   c) receiving from an author selection information identifying the selected one of the available components;
   d) displaying a customizer interface and permitting an author to specify properties for the selected available component;
   e) generating runtime text corresponding to the selected available component, the runtime text being separate from the selected available component;
   f) providing the runtime text to the client object; and
   g) writing information identifying and specifying the properties of the client object instance used in the web page and identifying the selected available component included in the web page to the web page source file, wherein the web page source file is a file that is separate from the web page and that is used to generate the web page and define functionality of the web page as well as other web pages.

2. The method of claim 1 wherein the client object comprises a design time control.

3. The method of claim 1 wherein the client object comprises a Java bean encapsulated in an Active X control.

4. The method of claim 1 wherein displaying a customizer interface comprises, invoking a method of the client object to request that the switchboard provide the customizer interface.

5. The method of claim 4 wherein displaying the customizer interface comprises passing from the client object to the switchboard identification information which identifies the selected one of the available components and, at the switchboard, obtaining a list of properties of the selected one of the available components and providing in the customizer interface a control for setting a value of each of the properties.

6. The method of claim 5 wherein displaying the customizer interface comprises providing to the switchboard previously generated runtime text and the method comprises, determining from the runtime text a previously set value for each of the properties and displaying the previously set value for each of the properties in the customizer interface.

7. The method of claim 1 wherein generating the runtime text comprises providing an initial tag, a final tag, and runtime text between the initial and final tags.

8. The method of claim 7 wherein the initial tag includes identification information for the selected available component.

9. The method of claim 7 wherein generating the runtime text comprises determining whether or not all of the properties are set to default values, in response to the determination, generating a default tag, the default tag having a value which indicates whether or not all of the properties are set to default values, and inserting the default tag into the runtime text.

10. The method of claim 9 comprising producing a source file containing the runtime text.

11. The method of claim 10 comprising updating the source file by: identifying runtime text by locating the initial and final tags in the source file; if the default tag indicates that all of the properties are set to default values, determining whether there is a newer version of the component corresponding to the runtime text and, if there is a newer version of the component, generating runtime text corresponding to the newer version of the component, and replacing the runtime text in the source file with the runtime text corresponding to the newer version of the component.

12. The method of claim 1 wherein displaying the customizer interface comprises causing the client object to invoke a function and providing the runtime text to the client object comprises supplying the runtime text to the function and permitting the function to return the runtime text to the client object.

13. A method for updating a web page comprising one or more reusable software components, the method comprising:
   a) providing a web page comprising one or more instances of a client object, each instance of the client object having selection information identifying a corresponding original reusable software component, the client object adapted for using the reusable software component in a web page, the original reusable software component having one or more configurable properties;
   b) providing an updated set of software components;
   c) reading from an instance of the client object the selection information and determining whether a newer version of the reusable software component identified by the selection information is available; and,
   d) if a newer version of the reusable software component identified by the selection information is available, replacing the selection information with new selection information identifying the newer version of the reusable software component and automatically retrieving the one or more configurable properties of the original reusable software component from a web page source file, which is separate from the web page and that is used to generate the web page and define functionality of the web page as well as other web pages, for use in the newer version of the reusable software component, wherein the original reusable software component is replaced with the newer version of the reusable software component without re-specifying all of the one or more configurable properties of the selected reusable software component.

14. The method of claim 13 wherein the newer version of the reusable software component has a common set of one or more properties in common with a set of properties of the original reusable software component and the method comprises:

a) determining values for properties in the common set of the original reusable software component; and, b) automatically setting values for the properties in the common set of the newer version of the reusable software component to be the same as the values of the properties in the common set of the original reusable software component.

15. The method of claim 14 wherein determining values for properties in the common set of the original reusable software component comprises reading runtime text corresponding to the original reusable software component.

16. A method for updating source code for a web page, the source code being stored in a web page source file, which is separate from the web page and that is used to generate the web page and define functionality of the web page as well as other web pages, the source code comprising one or more blocks of runtime text each corresponding to a configurable reusable component and separate from the configurable reusable component, each block of runtime text comprising a default indicator indicating whether or not the corresponding configurable reusable component was in a default configuration, the method comprising:
   a) selecting a block of runtime text for which the default indicator indicates that the corresponding configurable reusable component for use in the web page was in a default configuration;
   b) identifying a configurable reusable component corresponding to the selected block of runtime text;
   c) determining whether there is a newer version of the configurable reusable component;
   d) based on the determining step, if there is a newer version of the configurable reusable component, automatically retrieving from the web page source file one or more configurable properties of the configurable reusable component for use in the newer version of the reusable software component and generating runtime text corresponding to the newer version of the configurable reusable component that include the one or more configurable properties the runtime text being separate from the newer version of the configurable reusable component; and,
   e) replacing the block of runtime text in the source code that describes components included in the web page with the runtime text corresponding to the newer version of the component,
   wherein the selected reusable component may be replaced with the newer version without re-specifying all properties of the selected reusable component.

17. The method of claim 16 comprising repeating the steps recited in claim 16 for all of the blocks of runtime text for which the default indicator indicates that the corresponding configurable reusable component was in a default configuration.

18. The method of claim 17 wherein the default indicator comprises a tag.

19. Apparatus for creating web pages, the apparatus comprising a computer system having:
   a) a client software object, the client software object capable of retrieving a list of one or more available reusable software components for use in a web page, identifying a selected one of the available reusable software components selected by an author, and receiving runtime text corresponding to the selected reusable software component and separate from the selected reusable software component, wherein the client software object is adapted to use the selected reusable software component in the web page;
   b) web publishing software capable of incorporating runtime text from one or more instances of the software client object in a source file that is a file that is separate from the web page, that describes the components included for the web page, and that is used to generate the web page and define functionality of the web page as well as other web pages; and,
   c) switchboard software capable of generating runtime text corresponding to the selected reusable component and providing the runtime text to a corresponding instance of the client software object for inclusion in the runtime file.

20. The apparatus of claim 19 wherein the client software object comprises a Design Time Control.

21. The apparatus of claim 19 wherein client software object comprises a Design Time Control, the Design Time Control comprising a JAVA Bean encapsulated in an Active X control.

22. The apparatus of claim 19 comprising an update tool, the update tool comprising software which causes the computer system to:
   a) read properties of an original instantiated reusable component from the source file;
   b) instantiate an updated version of the instantiated reusable component; and,
   c) configure properties of the updated version of the instantiated reusable component to match the properties of the original instantiated reusable component.

23. Apparatus for creating web pages, the apparatus comprising a computer system providing:
   a) one or more available reusable software components for use in a web page, each comprising rules for the generation of corresponding runtime text;
   b) a means for providing a list of available reusable components;
   c) a means for configuring properties of a selected reusable component; and
   d) a client software object, adapted to receive the list of available reusable components, to allow an author to select one of the available reusable components and to receive runtime text separate from the selected reusable component from the selected one of the available reusable components for placement in a source file that is a file that is separate from the web page, describes the components included in the web page, and is used to generate the web page and define functionality of the web page as well as other web pages, wherein the client software object is adapted to use the selected reusable software component in the web page.

24. The apparatus of claim 23 comprising web publishing software capable of instantiating a plurality of instances of the client software object and incorporating the received runtime text from each of the instances of the client software object into a source file.

25. The apparatus of claim 24 wherein the client software object comprises a design time control.

26. An article of manufacture comprising a program storage medium readable by a computer and embodying one or more instructions executable by the computer to perform a method for creating a web page according to any of claims 1, 13, 16, 17 or 18.

27. An article of manufacture comprising a program storage medium readable by a computer and embodying one or more instructions executable by the computer to perform a method for creating a web page according to claim 13.

28. An article of manufacture comprising a program storage medium readable by a computer and embodying one or more instructions executable by the computer to perform a method for creating a web page according to claim 16.

29. An article comprising:
   a) a computer-readable signal-bearing medium;
   b) means in the medium for delivering to a client object instance in a web page a list of available reusable software components for use in the web page;
   c) means in the medium for receiving selection information identifying a selected one of the available components to be used in the web page by the client object instance;
   d) means in the medium for displaying a customizer interface and receiving information specifying properties for the selected one of the available components;
   e) means in the medium for automatically retrieving from a web page source file, which is separate from the web page and that is used to generate the web page and define functionality of the web page as well as other web pages, one or more configurable properties of the configurable reusable component for use in the newer version of the reusable software component and for generating runtime text corresponding to the selected one of the available components that include the one or more configurable properties and separate from the selected one of the available components; and,
   means in the medium for providing the runtime text to the client object.

30. The article of claim 29, wherein the medium is a tangible data storage medium.

31. An article comprising:
   a) a computer-readable signal-bearing medium;
   b) switchboard software on tho signal-bearing medium, the switchboard software comprising:
      i) a client object interface capable of providing a list of available components for use in a web page to an instance of a client object and receiving selection information identifying a selected one of the available components from the instance of the client object, the selected one of the available components for use in the web page by the client object;
      ii) a customizer interface capable of displaying current values for one or more configurable properties of the selected one of the available components and receiving configuration information specifying new values for the one or more configurable properties; and,
      iii) a run-time text generator generating run-time text in response to the selection information and the configuration information and forwarding the run-time text to the instance of the client object for inclusion in a web page, the client object being stored in a web page source file, wherein the web page source file is a file that is separate from the web page and that is used to generate the web page and define functionality of the web page as well as other web pages.

32. The article of claim 31 further comprising library software on the signal-bearing medium, the library software comprising a plurality of available components.

33. The article of claim 32 wherein the library software comprises library management software which, when executed, maintains a list of available components in the library.

34. The article of claim 31 further comprising an update tool on the signal-bearing medium, the update tool comprises software which, when run on a computer system, causes the computer system to: read properties of an original instantiated reusable component; instantiate an updated version of the instantiated reusable component; and, configure properties of the updated version of the instantiated reusable component to match the properties of the original instantiated reusable component.

35. The article of claim 31 further comprising a client object on the signal-bearing medium, the client object adapted to be incorporated into a web page by web publishing software, the client object comprising computer executable instructions for requesting from the switchboard a list available components.

36. The article of claim 31, wherein the medium is a tangible data storage medium.

* * * * *